(12) United States Patent
Myles

(10) Patent No.: US 9,614,804 B2
(45) Date of Patent: Apr. 4, 2017

(54) MANAGING MESSAGES BASED ON EXPIRATION DATES

(71) Applicant: Dropbox, Inc., San Francisco, CA (US)

(72) Inventor: Gideon M. Myles, Oakland, CA (US)

(73) Assignee: DROPBOX, INC., San Francisco, CA (US)

( * ) Notice: Subject to any disclaimer, the term of this patent is extended or adjusted under 35 U.S.C. 154(b) by 270 days.

(21) Appl. No.: 14/280,479

(22) Filed: May 16, 2014

(65) Prior Publication Data

US 2015/0331881 A1 Nov. 19, 2015

(51) Int. Cl.
*G06F 17/00* (2006.01)
*H04L 12/58* (2006.01)
*G06F 17/30* (2006.01)

(52) U.S. Cl.
CPC ........ *H04L 51/22* (2013.01); *G06F 17/30117* (2013.01)

(58) Field of Classification Search
CPC ........................... H04L 51/22; G06F 17/30117
USPC ........................................................ 707/689
See application file for complete search history.

(56) References Cited

U.S. PATENT DOCUMENTS

| | | | | |
|---|---|---|---|---|
| 7,912,913 B2* | 3/2011 | Accapadi | ............. | G06Q 10/107 709/206 |
| 2003/0018724 A1* | 1/2003 | Mathewson, II | .... | G06Q 10/109 709/206 |
| 2007/0038711 A1* | 2/2007 | MacBeth | ............. | G06Q 10/107 709/206 |
| 2009/0100332 A1* | 4/2009 | Kanjilal | ............... | G06Q 10/109 715/235 |
| 2010/0185665 A1* | 7/2010 | Horn | ..................... | G06Q 10/107 707/769 |
| 2013/0282836 A1* | 10/2013 | DeLuca | ................. | G06Q 10/10 709/206 |
| 2013/0342315 A1* | 12/2013 | Verstraete | ................ | G08B 5/00 340/7.51 |
| 2015/0142897 A1* | 5/2015 | Alten | ..................... | H04L 51/36 709/206 |

(Continued)

OTHER PUBLICATIONS

Bond, Ben, "Set Outlook Emails to Delete in the Future," [online], the MOST (McCombs Office Solutions and Tips), Feb. 24, 2011, [retrieved on May 24, 2014], retrieved from the internet: <URL: http://blogs.mccombs.utexas.edu/the-most/2011/02/24/set-outlook-emails-to-delete-in-the-future/>, 6 pages.

(Continued)

*Primary Examiner* — Phong Nguyen
(74) *Attorney, Agent, or Firm* — Stephanie Wang; Page Ponsford; DLA Piper LLP US

(57) ABSTRACT

Messages can be managed based on expiration dates. For instance, a message having an expiration date can be removed from the recipient's inbox until the expiration date becomes imminent, automatically restored to the inbox when the expiration date becomes imminent, and automatically expired from the inbox (e.g., by deleting the message) after the expiration date has passed. Expirable messages can be identified based on user input and/or automatic extraction of expiration-date information from the message. Visual indicators can be used to distinguish a message whose expiration date is imminent from other messages in the inbox.

19 Claims, 15 Drawing Sheets

(56) References Cited

U.S. PATENT DOCUMENTS

2015/0178331 A1* 6/2015 Tyagi ............... G06F 17/30312
                                                                        707/736

OTHER PUBLICATIONS

Raza, Aun, "Outlook 2010: Set Up the Expiry Date on Email Messages," [online], Addictive Tips, Jan. 12, 2010, [retrieved on May 25, 2014], retrieved from the internet: <URL: http://www.addictivetips.com/windows-tips/outlook-2010-set-up-the-expiry-date-on-email-messages/>, 3 pages.

Needleman, Rafe, "E-mail Innovator Pitches Self-Deleting E-mails," [online], CNet.com, Feb. 25, 2011, [retrieved on Apr. 23, 2014], retrieved from the internet: <URL: http://www.cnet.com/news/e-mail-innovator-pitches-self-deleting-e-mails/>, 3 pages.

"Deleting and Expiring Settings in AutoArchive Explained," [online], Microsoft.com, 2014, [retrieved on May 25, 2014], retrieved from the internet: <URL: http://office.microsoft.com/en-us/outlook-help/deleting-and-expiring-settings-in-autoarchive-explained-HA010251127.aspx>, 2 pages.

* cited by examiner

MANAGING MESSAGES BASED ON EXPIRATION DATES

BACKGROUND

The present disclosure relates generally to electronic message management systems and services and in particular to managing messages based on expiration dates.

In recent years, electronic messaging services have increased in popularity. Email, for example, has become a vital tool for communication. So many messages are sent and received that users can spend many hours per day just keeping up with the flood and dreaming of an empty inbox. Such dreams are complicated by the fact that messages generally arrive based on when the sender decides to send them, not when the recipient wants or needs to receive the information contained therein. Better techniques for managing messages are therefore desirable.

SUMMARY

Some of the messages a user receives can involve an expiration date. As used herein, an "expiration date" of a message refers to a date (or more specific time) after which the information contained in the message loses its relevance or importance. For example, a message may include a coupon or other offer that the user can redeem (e.g., to purchase goods or services), and the offer may only be valid during a certain range of dates, after which it expires. Once that range of dates has passed, the user likely would no longer be interested in the message since the expired offer cannot be redeemed.

Difficulties can arise for users in trying to keep track of offers they have received. For instance, a user who receives an offer and decides she might want to redeem it later might file it (e.g., in an "Offers" folder) for later use. But as time passes and the user is inundated with messages and other information, the user can easily forget about the offer until after its expiration date, unless the user takes the time to peruse the Offers folder on a regular basis. Alternatively, the user might try to keep the message visible, e.g., by leaving it in the inbox, until the offer is redeemed or expires; however, this "solution" can lead to clutter in the user's inbox.

Accordingly, certain embodiments of the present invention relate to systems and methods for managing messages based on expiration dates that can be assigned to messages. Such systems and methods can allow messages with expiration dates to be removed from the recipient user's inbox until the expiration date is imminent, automatically restored to the inbox when the expiration date becomes imminent, and automatically expired from the inbox (e.g., by deleting the message) once the expiration date has passed. Automatic restoration of the message to the user's inbox can allow a user to be reminded of an offer or other information while there is still an opportunity to act on it, while automatic expiration of messages that have expired can allow the user's message collections to be kept largely or entirely clear of expired messages.

In some embodiments, a system (or the user) can determine that a message involves an expiration date (such messages are referred to herein as "expirable"). Examples of expirable messages include coupons (e.g., time-limited offers redeemable for discounts on goods and services); invitations or tickets to, or other messages about, events that take place on a specific date or in a specific date range (e.g., a sale event at a store, a meeting, a concert); and so on. When an expirable message is identified, the system can add expiration metadata indicating the expiration date to the message and can add the message to an "auto-reminder" collection of messages so that it ceases to appear in the user's inbox. To remind the user that an expirable message is about to expire, the system can periodically check the expiration metadata for messages in the auto-reminder collection and identify messages having an expiration date that is imminent (e.g., the next day, two days from now, or some other criterion). Messages with imminent expiration dates can be restored to the user's inbox and can be visually highlighted to indicate to the user that the message is about to expire. Further, the system can periodically check the expiration metadata for messages in the user's inbox and/or auto-reminder collection and can identify messages whose expiration dates have passed. Expired messages can be permanently removed (or expired) from the inbox, e.g., by deleting them or moving them to an archival message collection. In some embodiments, expirable messages can remain in the inbox after being identified as expirable and can be promoted within the inbox when the expiration date is imminent (e.g., by placing the message at the top of the list of messages in the inbox and/or by marking the message with a visual indicator that the expiration date is imminent), then removed once the expiration date has passed.

The following detailed description together with the accompanying drawings will provide a better understanding of the nature and advantages of the present invention.

BRIEF DESCRIPTION OF THE DRAWINGS

FIG. 3A shows a user interface screen, and FIG. 3B shows an example of a confirmation prompt in connection with the screen of FIG. 3A.

FIG. 4A shows a user interface screen for a message list. FIG. 4B shows an example of a gesture input that can be used to identify a message as expirable. FIG. 4C shows an example of a selection menu that can be displayed in response to the gesture input of FIG. 4B. FIG. 4D shows an example of a confirmation prompt. FIG. 4E shows a modified state of a message list after temporarily removing an expirable message. FIG. 4F shows a message list at a later time.

DETAILED DESCRIPTION

Figure 1:
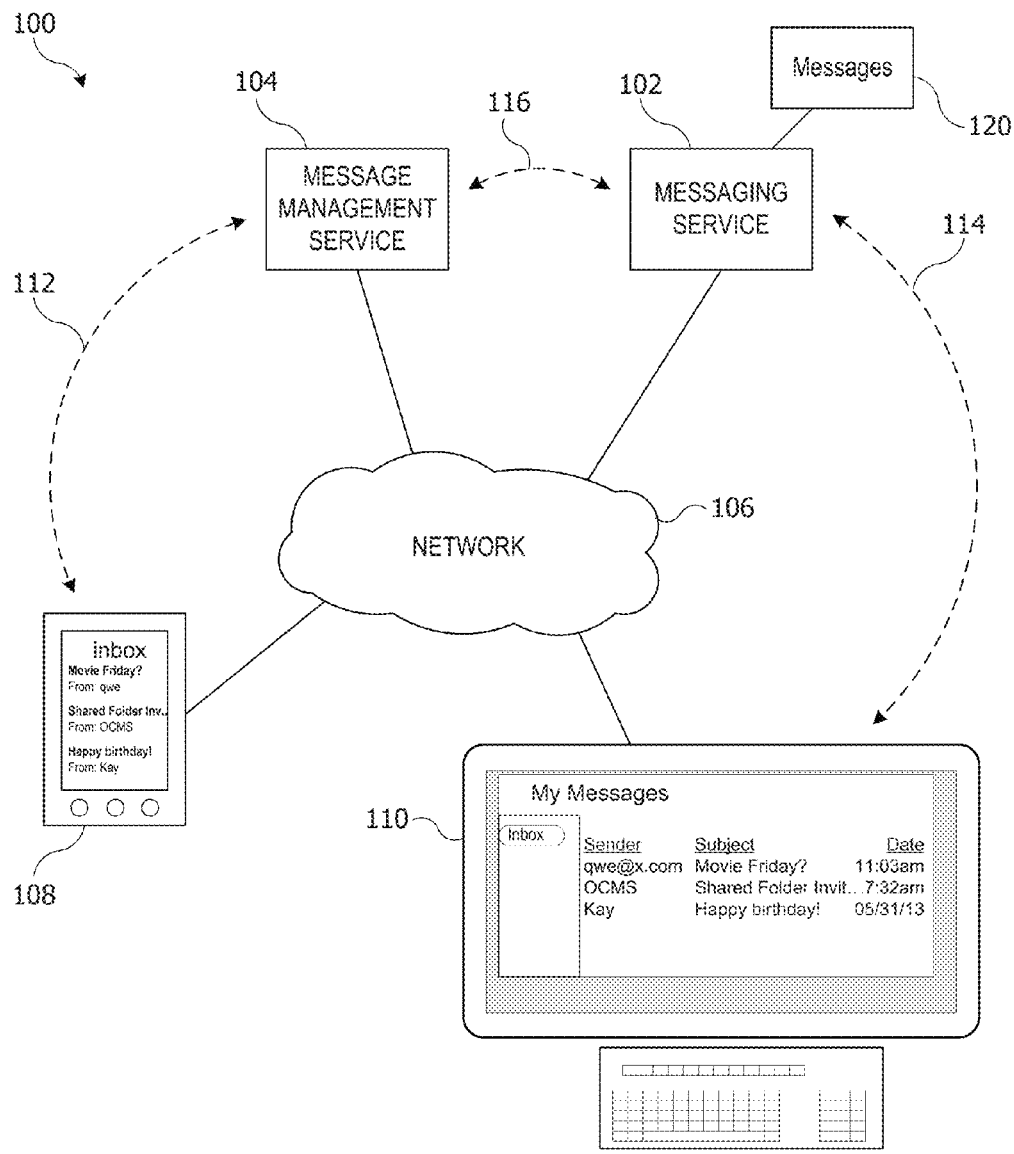
FIG. 1 shows a block diagram of a communication system according to an embodiment of the present invention.

Certain embodiments of the present invention relate to systems and methods for managing messages based on expiration dates that can be assigned to messages. Such systems and methods can allow messages with expiration dates to be removed from the recipient user's inbox until the expiration date is imminent, automatically restored to the inbox when the expiration date becomes imminent, and automatically expired from the inbox (e.g., by deleting the message) once the expiration date has passed. Automatic restoration of the message to the user's inbox can allow a user to be reminded of an offer or other information while there is still an opportunity to act on it, while automatic expiration of messages that have expired can allow the user's message collections to be kept largely or entirely clear of expired messages.

In some embodiments, a system (or the user) can determine that a message involves an expiration date (such messages are referred to herein as "expirable"). Examples of expirable messages include coupons (e.g., time-limited offers redeemable for discounts on goods and services); invitations or tickets to, or other messages about, events that take place on a specific date or in a specific date range (e.g., a sale event at a store, a meeting, a concert); and so on. When an expirable message is identified, the system can add expiration metadata indicating the expiration date to the message and can add the message to an "auto-reminder" collection of messages so that it ceases to appear in the user's inbox. To remind the user that an expirable message is about to expire, the system can periodically check the expiration metadata for messages in the auto-reminder collection and identify messages having an expiration date that is imminent (e.g., the next day, two days from now, or some other criterion). Messages with imminent expiration dates can be restored to the user's inbox and can be visually highlighted to indicate to the user that the message is about to expire. Further, the system can periodically check the expiration metadata for messages in the user's inbox and/or auto-reminder collection and can identify messages whose expiration dates have passed. Expired messages can be permanently removed (or expired) from the inbox, e.g., by deleting them or moving them to an archival message collection.

Detecting expirable messages can be performed in various ways. In some embodiments, the user can identify a message presented in the inbox as being expirable. In response, the system can attempt to extract the expiration date from the message. For example, the system can process the message body to identify expiration-related language (e.g., phrases such as "offer valid through [date]" or "expires [date]"), or the system can detect expiration-related headers in the received message. Where the system extracts an expiration date, the system can prompt the user to confirm the date. Where the system does not extract an expiration date, the system can prompt the user to enter an expiration date. In other embodiments, the system can automatically identify messages that appear to be expirable (e.g., based on message content and/or previous patterns of user behavior) and can suggest appropriate treatment. The user can confirm or reject the system's identification.

As noted above and described further below, expirable messages can be restored to the user's inbox when the system determines that expiration is "imminent." Criteria for determining imminent expiration can be implementation-dependent (e.g., on the expiration date, one day before, two days before, etc.). In some embodiments the user can specify the criteria for determining imminent expiration, either globally (for all expirable messages) or on a per-message basis.

Examples of systems and methods for managing expirable messages will now be described.

FIG. 1 shows a block diagram of a communication system 100 according to an embodiment of the present invention. Communication system 100 can include a messaging service 102 and a message management service 104 connected to a network 106. Also connected to network 106 can be various clients 108, 110 that can be used to access messaging service 102 and/or message management service 104. In this example, client 108 accesses message management service 104 (as indicated by dashed arrow 112) while client 110 accesses messaging service 102 (as indicated by dashed arrow 114).

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo!® Mail (a service of Yahoo! Inc.). Other examples can include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). In some embodiments, a user can establish an account with messaging service 102, and messaging service 102 can store and provide access to the user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and a client 108, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

In some embodiments, enhanced functionality provided by message management service 104 can include managing messages based on expiration dates. For instance, the recipient, or in some instances the sender, can identify a message as an expirable message (i.e., a message that has an expiration date, meaning a date after which its content will no longer be of interest to the recipient). When a message is identified as expirable, an expiration date can be established (e.g., by extracting the date from the message or via user input). Messages identified as expirable can be temporarily removed from the recipient's inbox (where "inbox" refers generally to a default message collection to which newly received messages for a particular user are assigned until the user reviews them and reassigns them) and added to an "auto-remind" collection of messages. Messages in the auto-remind collection can be automatically restored to the inbox or otherwise brought to the attention of the recipient at a specified time prior to their expiration date (e.g., one day before, two days before, the day of, etc.) and automatically expired (permanently removed) from the inbox once the expiration date has passed. In this manner, the recipient can receive a timely reminder to take action on the message, e.g., before an offer contained in the message expires. Examples of managing expirable messages are described below.

Clients 108 and 110 can be user-operated computing devices that can execute software to interact with message management service 104 and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions such as managing expirable messages. For example, a user interface of client 108 can be configured to allow the user to indicate that a message is expirable, e.g., by performing a specific gesture or other input operation. When the user indicates to client 108 that a particular message is expirable, client 108 can communicate appropriate instructions (e.g., including expiration metadata as described below) to message management service 104, and message management service 104 can treat the message accordingly, e.g., by performing expirable-message processing operations as described herein.

Client 110 can be a desktop computer that can execute an app to communicate with messaging service 102 and/or message management service 104. This app can be, for example, a mail client app built into an operating system of a desktop computer, a web browser that interfaces with a web-based messaging service, a service-specific application provided by the provider of messaging service 102 or the provider of message management service 104, or another app.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104.

Figure 2:
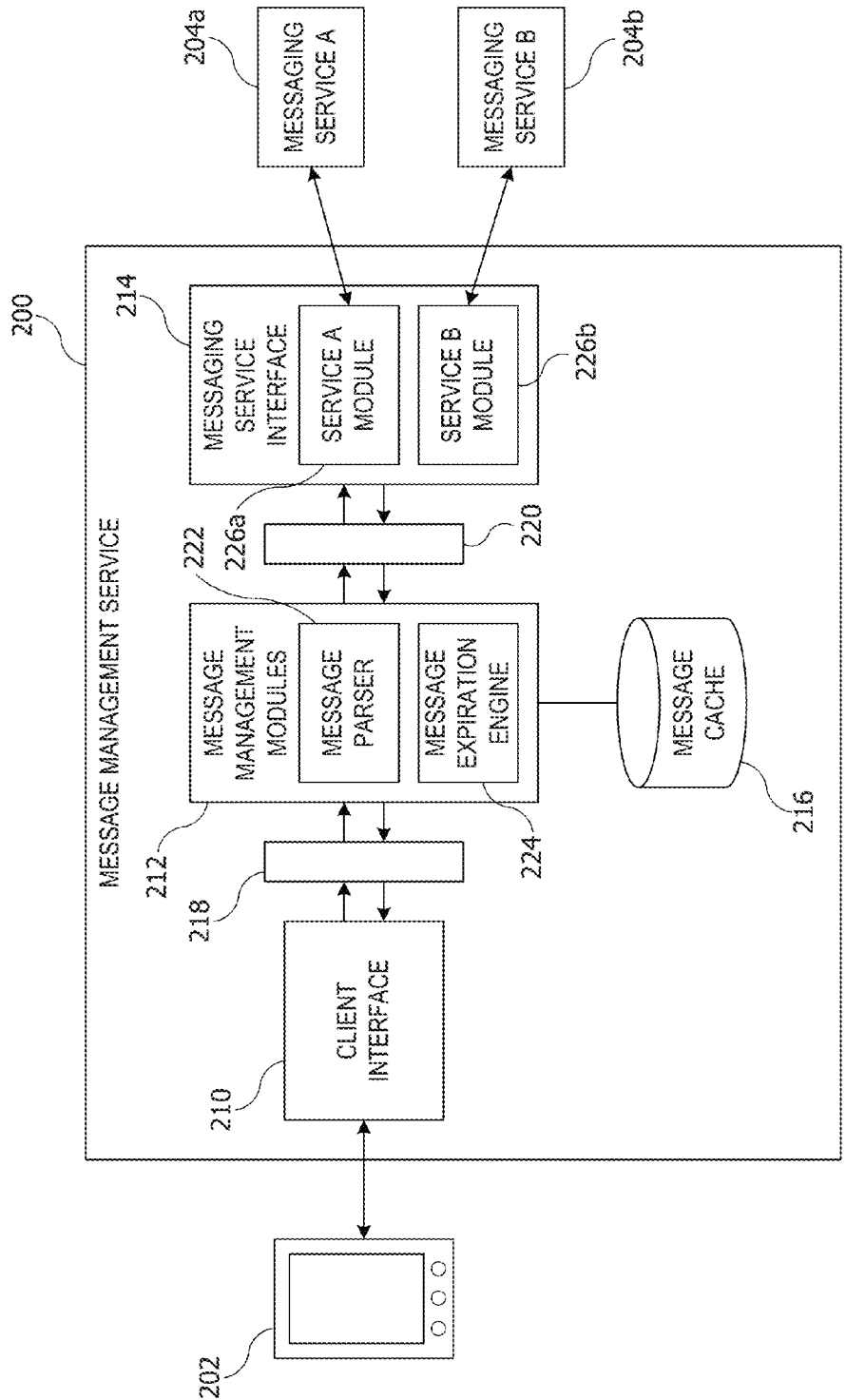
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between a client 202 (e.g., implementing client 108 or client 110 of FIG. 1) and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include a client interface 210, message management modules 212, a messaging service interface 214, and a message cache 216. A client transfer layer 218 can provide transfer queues for transferring messages and other instructions and information between client interface 202 and message management modules 212, and a service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions to defer a message.

Message management modules 212 can include functional blocks or modules configured to perform various operations on messages received by message management service 200, including outbound messages received from client 202 as well as inbound messages received from messaging services 204a, 204b. For example, message management modules 212 can include message parser 222 and message expiration engine 224. Message parser 222 can detect the presence of expiration-related language in a received (e.g., inbound) message, e.g., using textual analysis techniques applied to the message body and/or detection of expiration-related message headers. In some embodiments, message parser 222 can analyze each new inbound message to detect expiration-related language prior to sending the message to a client device. If expiration-related language is found, message parser 222 can add expiration metadata to the message indicating the expiration-related language. The expiration metadata can include, e.g., a flag indicating that the message contains expiration-related language and/or the expiration date extracted from the message. Examples of operations of message parser 222 are described below.

Message expiration engine 224 can manage expirable messages. As described above, expirable messages can be temporarily removed from the user's inbox, restored to the inbox when the expiration date becomes imminent, and subsequently expired from the inbox (e.g., deleted) after the expiration date has passed. Message expiration engine 224 can manage this process. For example, message expiration engine 224 can receive an instruction to treat a particular message as expirable, e.g., from message parser 222 or via client interface 210. The instruction can include the expirable message or an identifier thereof, as well as expiration metadata defining the expiration date. Message expiration engine 224 can temporarily remove the message from the user's inbox, e.g., by sending an instruction to messaging service interface 214 to instruct messaging service 204 to move the message from the inbox to a folder or other message collection designated for temporarily storing expirable messages (such a collection is referred to herein as an "auto-remind" collection). Message expiration engine 224 can periodically process the expiration metadata for messages in the auto-remind collection to determine whether a condition for restoring a particular message to the inbox has been met, e.g., whether the expiration date of the message is imminent. If the condition for restoring a particular message is met, message expiration engine 224 can restore the message to the user's inbox. Message expiration engine 224 can also periodically process messages in the user's inbox to determine whether any of the messages have an expiration date that has passed. If a message's expiration date has passed, message expiration engine 224 can remove the message from the inbox, e.g., by sending an instruction to messaging service interface 214 to instruct messaging service 204 to delete the message or to move the message to an archive collection (from which it may be deleted later). At this point, the message can be regarded as having been permanently removed, or expired, from the inbox, meaning that message management service 200 will not thereafter automatically restore the expired message to the inbox, although in some embodiments, if the user has access to the expired message, the user can manually restore it to the inbox.

Messaging service interface 214 can include various service modules 226a, 226b, each of which can be configured to communicate with a different one of messaging services 204a, 204b. For example, different messaging services 204 may support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Message cache 216 can be a database or other data store that provides storage and retrieval of messages. For example, messages can be stored and retrieved by reference to message identifiers (message IDs) assigned to each message by message management service 200 and/or messaging services 204. Message management service 200 can use message cache 216 to store copies of messages that are likely to be of interest to a client, such as recently received messages or messages found in a user-initiated search. Messaging services 204 can maintain their own message stores independently of any action by message management service 200. In some embodiments, messaging service 204 can maintain a primary store of messages for a user that can include all messages currently associated with that user's account (e.g., including sent messages, received messages, archived messages, etc.), and message cache 216 can store a subset of the user's messages as well as information about additional messages in the primary store. If client 202 requests a message that is not presently stored in message cache 216, message management service 200 can retrieve the message from the appropriate messaging service 204 and deliver it to client 202.

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management modules 212 can perform various operations on inbound and/or outbound messages.

For example, in some embodiments, message management modules 212 can operate to manage expirable messages received from client 202 or from messaging service 204. When a message reaches message management modules 212 (in either the inbound or outbound direction), message parser 222 and/or message expiration engine 224 can analyze the message to detect the presence of expiration metadata. If expiration metadata is detected, message expiration engine 224 can take appropriate action, such as determining whether to move the message to the auto-remind message collection, restore the message to the user's inbox, delete the message, and so on. Specific examples of such operations are described below.

It will be appreciated that message management service 200 is illustrative and that variations and modifications are possible. For example, other message management modules and/or operations can be provided. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of attachments, synchronization with messaging services 204 (e.g., relaying instructions from client 202 to move or modify messages) and so on.

Figure 3A:
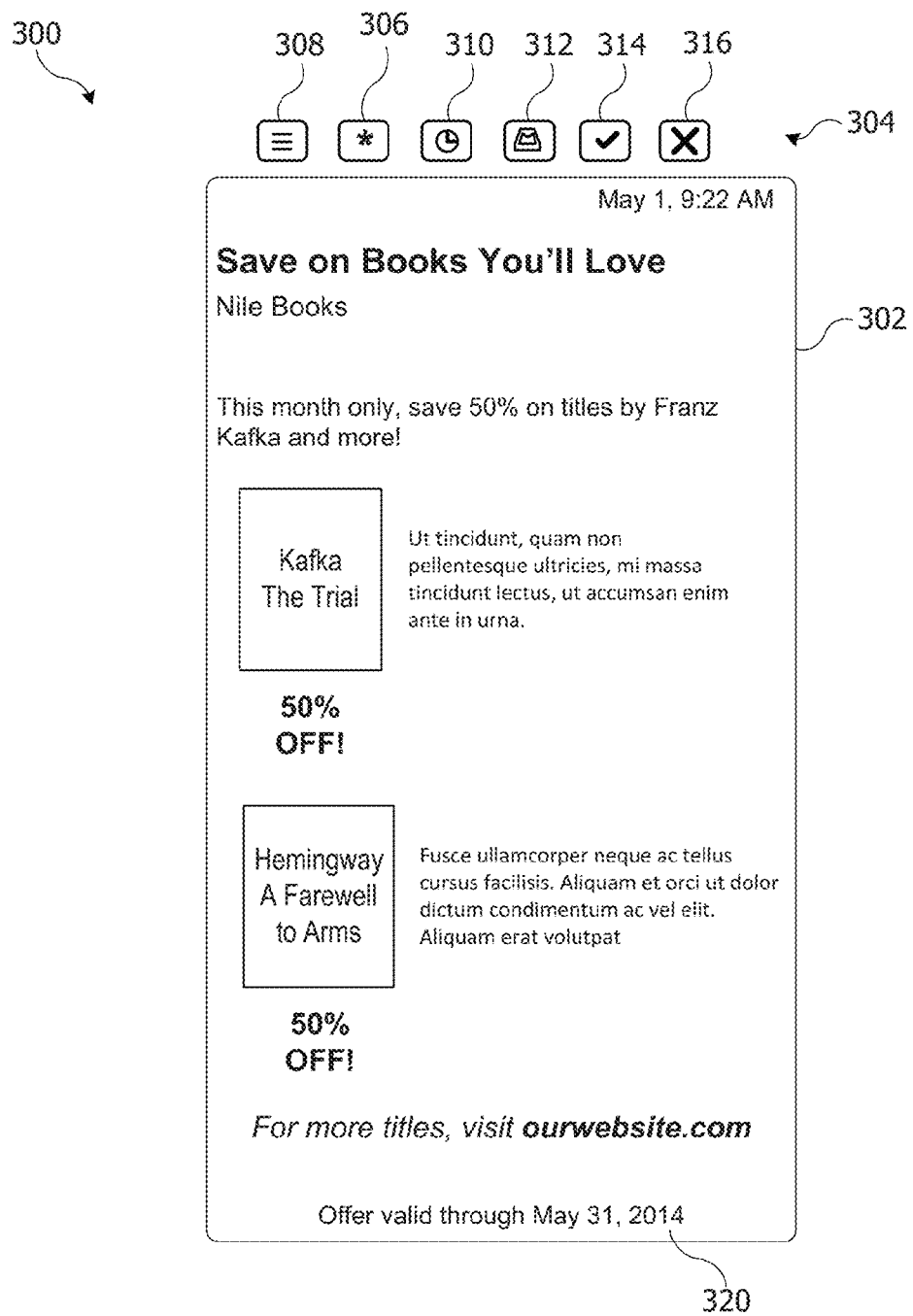
FIGS. 3A-3B show examples of identifying a message as expirable according to an embodiment of the present invention.

Examples of managing expirable messages from the user's perspective will now be described. FIG. 3A shows a user interface screen 300 according to an embodiment of the present invention. Screen 300 can be presented on a client device (e.g., client 108 or 110 of FIG. 1). Screen 300 can display a message 302 (e.g., an email message) and a set of interface controls 304 to allow the user to interact with message 302. In this example, interface controls 304 include control buttons to allow the user to move message 302 to a designated collection, e.g., by tapping a finger (or pointing and clicking with a mouse) on the control button that corresponds to the desired collection. For example, control button 306 can be operable to identify a message as expirable, which can result in moving the message to an auto-remind collection. Other controls 304 can be operable to indicate that a message should be moved to various other message collections. For example, control button 308 can designate a set of user-defined message list collections that can be associated with messages requiring user action; control button 310 can designate a deferred message collection (in examples herein, deferred messages, unlike expirable messages, are not assigned an expiration date or automatically deleted after that date); control button 312 can designate an inbox collection; control button 314 can designate an archive collection; and control button 316 can designate deletion of a message. Other control elements can also be provided, e.g., for replying to message 302, forwarding message 302, or composing a new message.

Message 302 in this example includes an offer to purchase various books at a discounted price. As indicated by text 320, the offer expires May 31, 2014. As indicated by timestamp 322, message 302 was received on May 1; thus, in this example, the user has a month to redeem the offer. When the offer first appears in the user's inbox (presumably on May 1), it may not be a convenient time for the user to shop for books, but the user may want to shop later. Accordingly, the user can select control button 306 to identify message 302 as an expirable message. In response, the client device can determine whether message 302 contains an expiration date. For example, as noted above, in some embodiments, message parser 222 can process inbound messages and add expiration metadata (including an expiration date) if expiration-related language, such as text 320, is detected. Where expiration metadata is present, the client device can read the expiration metadata from the as-received message. In other embodiments, the client device can parse the message text or perform other analysis on the message to extract an expiration date.

In the example of FIG. 3A, parsing the text of message 302 (by either the client device or message parser 222) can include detecting the phrase "offer valid through May 31, 2014," which is a phrase commonly used by senders of offers for indicating when the offer expires. "May 31, 2014" can thus be extracted as an expiration date. It should be understood that other phrases indicative of an expiration date can also be detected in a message. Examples include: "valid until <date>"; "expires <date>"; "use by <date>"; and so on, where <date> can be a date expressed in any of a variety of canonical formats (e.g., "May 31, 2014"; "5/31/14"; "31 May 2014"; "2014-05-31"; "May 31"; etc.). Expiration-related phrases and dates in various formats can be recognized using pattern-matching algorithms, including but not limited to conventional pattern-matching algorithms.

Figure 3B:
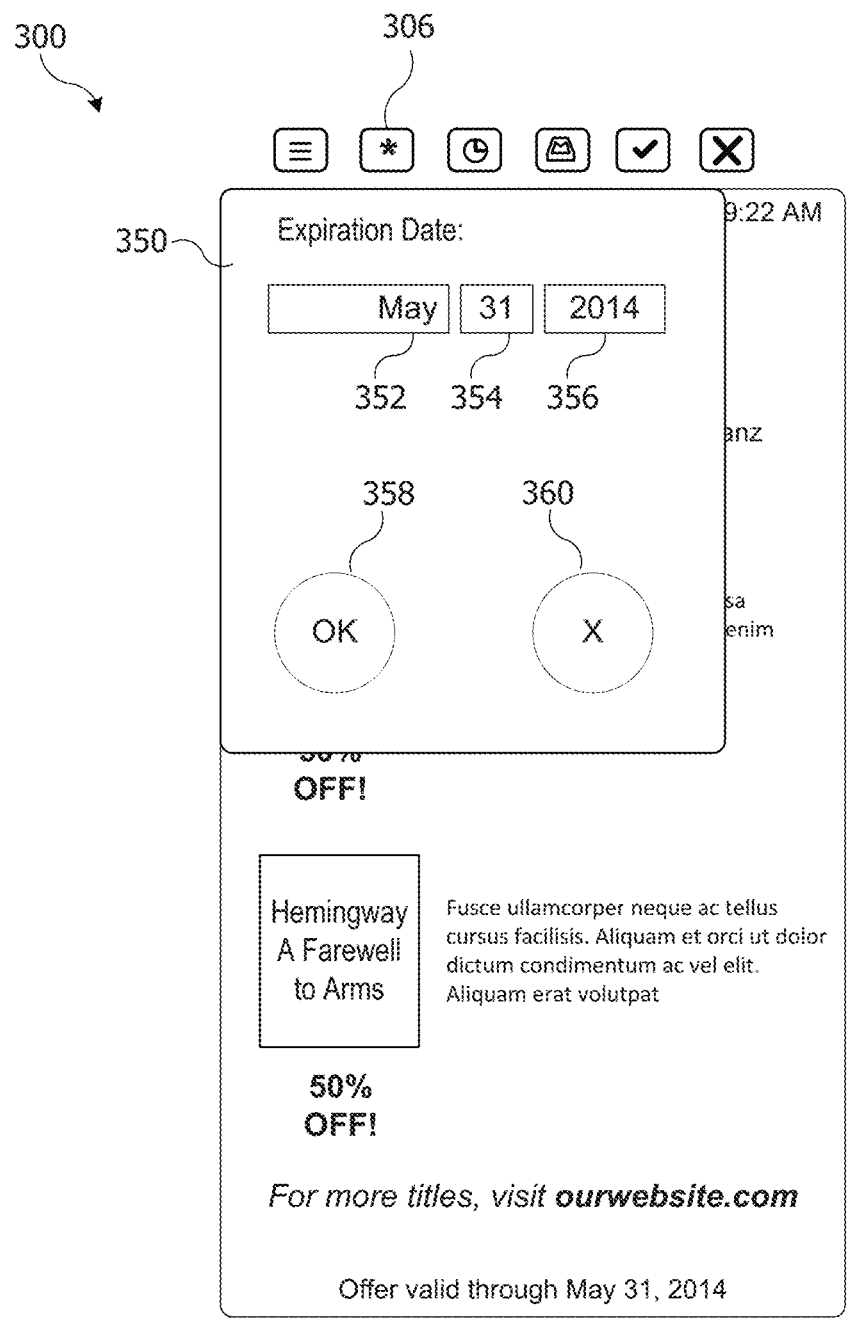

In some embodiments, once an expiration date is extracted, the user can be prompted to confirm the date. FIG. 3B shows an example of a confirmation prompt 350 that can be presented if the user operates control button 306 of FIG. 3A according to an embodiment of the present invention. Confirmation prompt 350 can be presented as an overlay or pop-up on user interface screen 300. Confirmation prompt 350 can present the extracted expiration date, e.g., using month box 352, date box 354, and year box 356. In some embodiments, boxes 352, 354, and 356 can be user-operable controls (e.g., drop-down menus, text entry boxes, or the like) via which the user can modify the expiration date if the extracted date is incorrect. "OK" control button 358 can be used to confirm the expiration date (with or without user modification). Selection of control button 358 can result in message 302 being moved to an auto-remind message collection until the expiration date becomes imminent. After moving message 302 to the auto-remind collection, the user interface can present a next message to the user, display a message list (e.g., a list of messages in the inbox), or display some other indicator that message 302 has been handled. In some embodiments, "cancel" control button 360 can be provided, and selection of button 360 can result in screen 300 returning to the state shown in FIG. 3A without moving message 302. In some embodiments, confirmation prompt 350 can be omitted entirely, or confirmation prompt 350 can be presented only in instances where an expiration date was not extracted by the system (e.g., where the expiration date is rendered in a graphical object or otherwise was not detected by the pattern-matching algorithm).

Figure 4A:
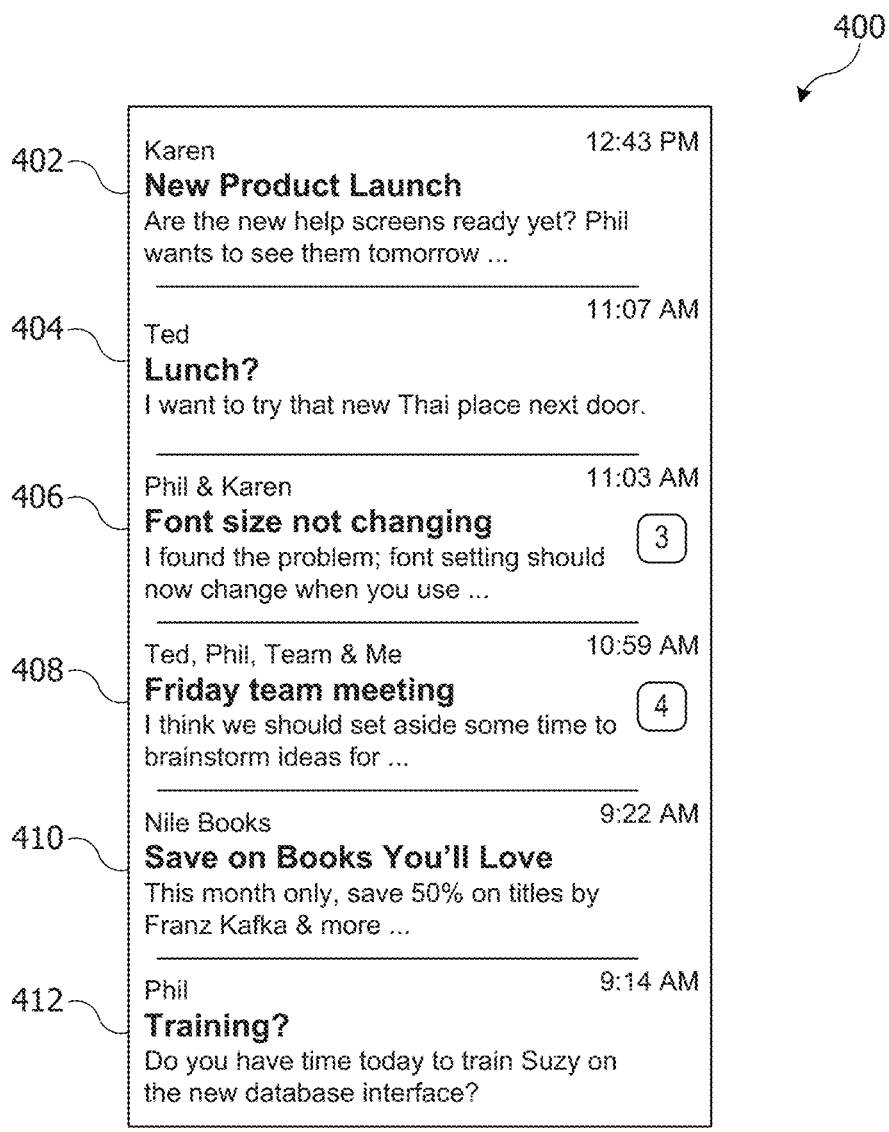
FIGS. 4A-4F show examples of managing an expirable message according to an embodiment of the present invention.

In some embodiments, a user can designate a message as expirable from a message list, e.g., without first viewing the message. FIG. 4A shows a user interface screen 400 for interacting with a message list according to an embodiment of the present invention. Screen 400 can be presented on a client device (e.g., client 108 or 110 of FIG. 1). Screen 400 can display a message list that includes representations of various messages 402, 404, 406, 408, 410, 412, which can be, for example, new messages in the user's inbox. In this example, a portion of the message information for each message can be presented (e.g., sender, subject, preview portion of content, time received, badges indicating related messages). In some instances, the user can recognize from the message list that a particular message pertains to an offer that will expire; for instance, the displayed representation of message 410 includes language suggestive of such an offer ("save 50%" and "this month only"). Accordingly, even without reading message 410, the user can decide to add message 410 to an auto-remind collection.

Figure 4B:
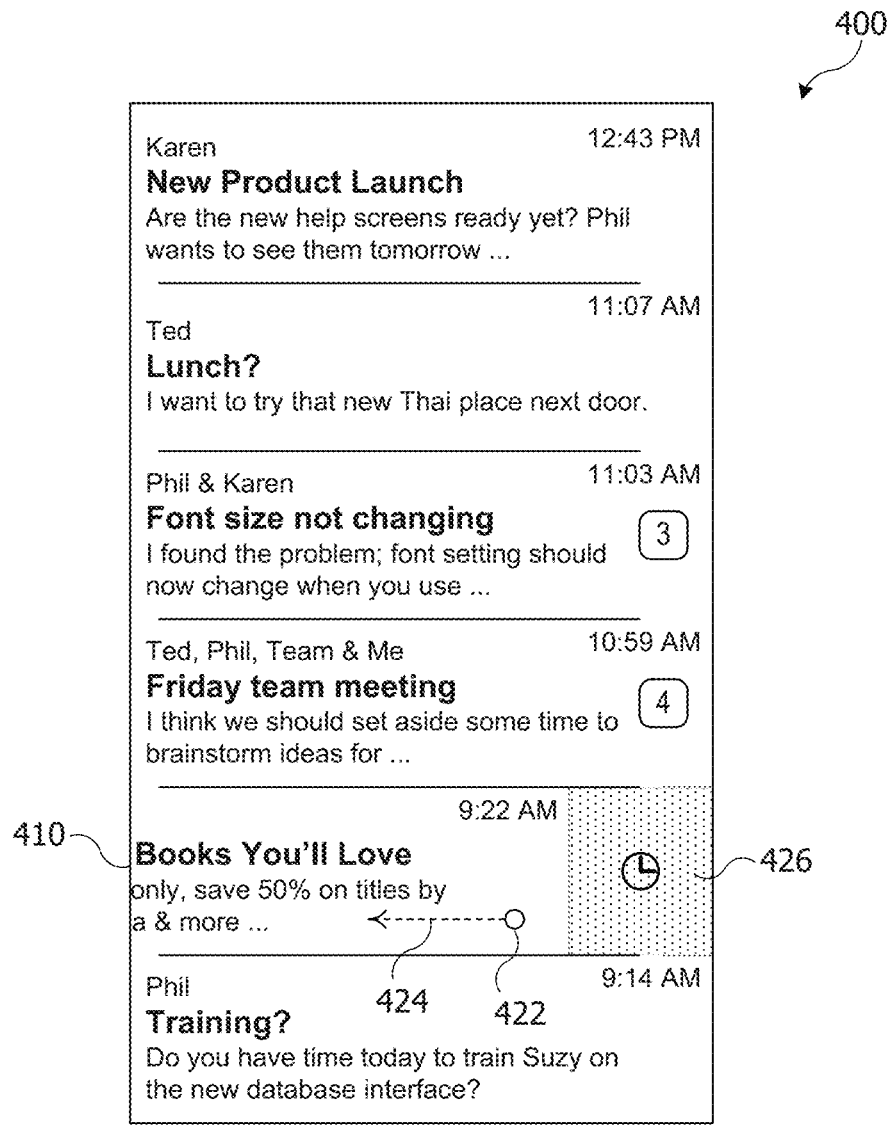

FIG. 4B shows an example of a gesture input that can be used to add a message to an auto-remind collection according to an embodiment of the present invention. The user can make a drag or swipe gesture, e.g., by moving a contact point 422 on a touch screen from right to left as indicated by arrow 424 or by making a similar dragging gesture using an on-screen cursor (not shown). Graphical element 426 can appear to indicate the option to defer a message, and the user can select this option by ending the drag or swipe motion while graphical element 426 is displayed. Other inputs can also be used.

Figure 4C:
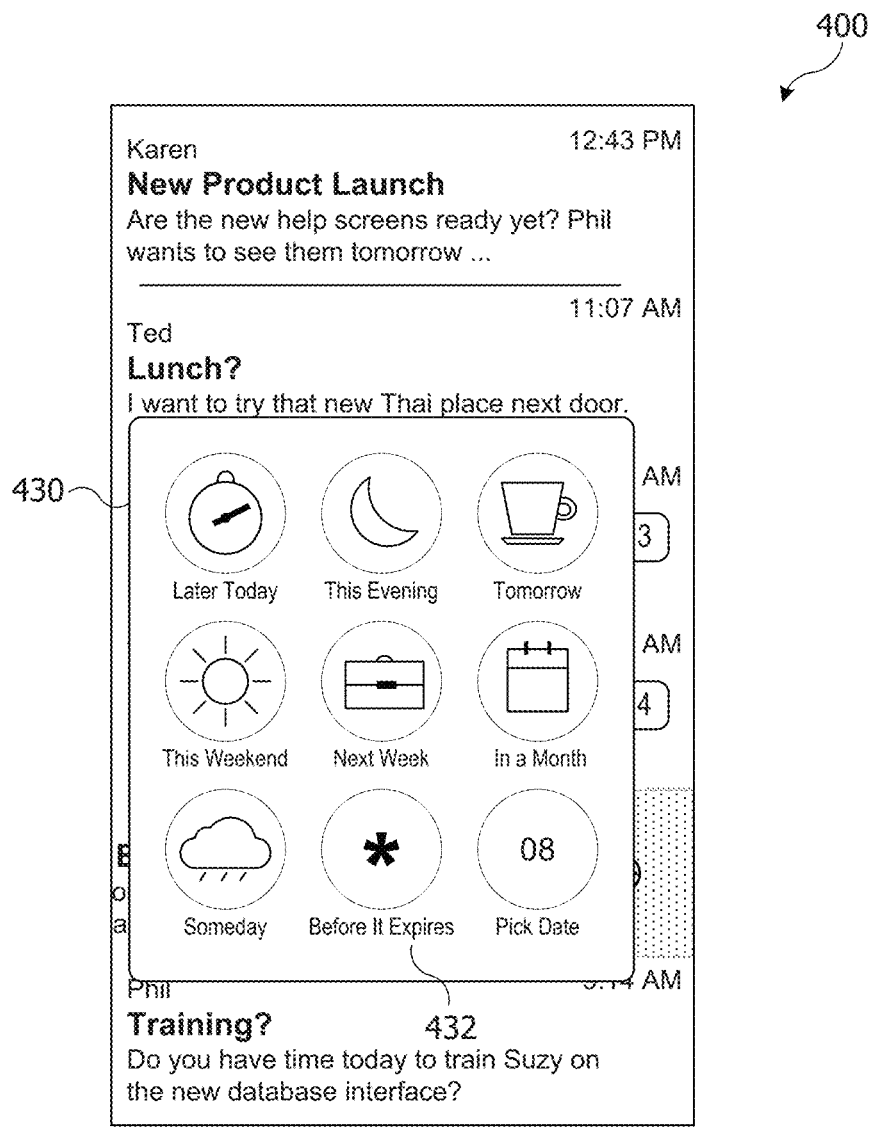

FIG. 4C shows an example of a selection menu 430 that can be displayed in response to the gesture input of FIG. 4B according to an embodiment of the present invention. Selection menu 430 can include various selectable options for deferring a message for later review, including a selectable option 432 to defer the message until "before it expires." In some embodiments, selectable option 432 can be used to distinguish expirable messages from other types of messages that the user may want to defer for later review. For example, while selecting other options from menu 430 can result in a deferred message being temporarily removed from the inbox and automatically restored to the inbox at a later date or time, no expiration date would be set and the message would not be automatically deleted. In contrast, selection option 432 can result in setting an expiration date for the message, allowing for automatic deletion as well as automatic reminding.

Figure 4D:
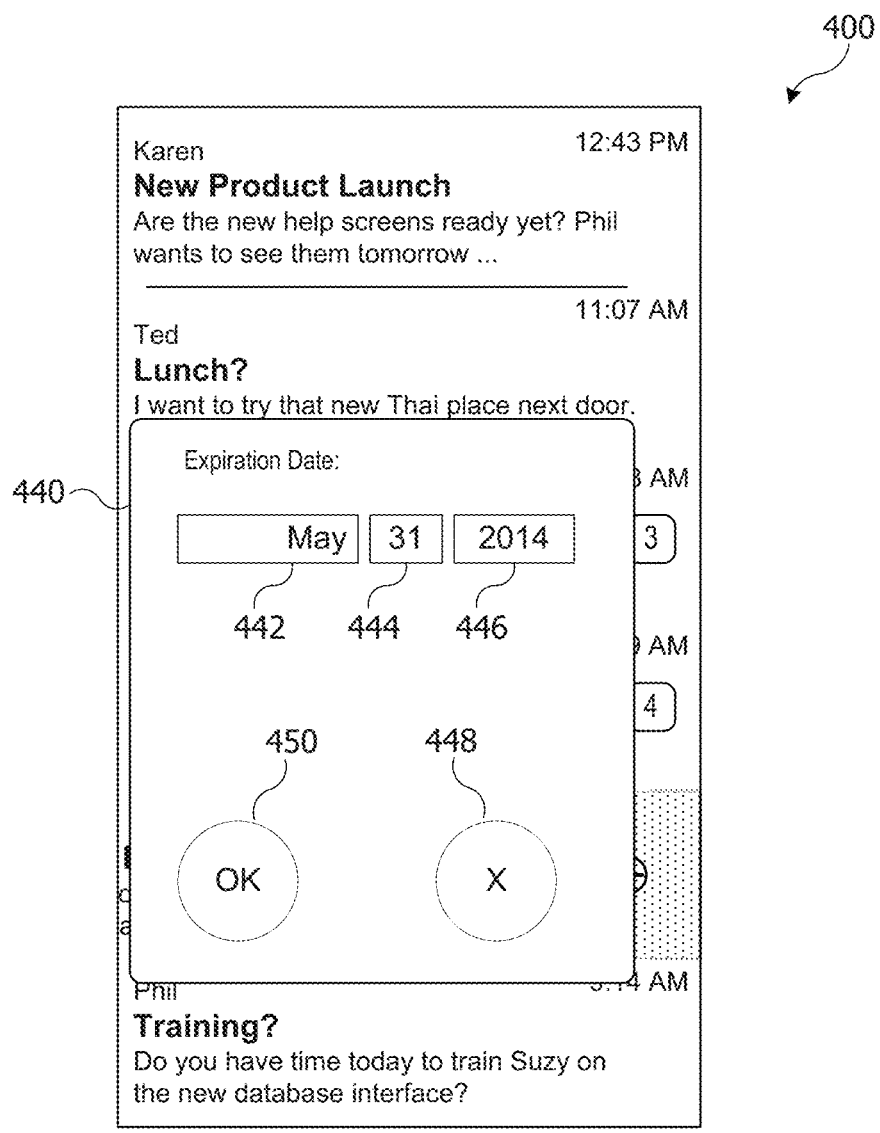

FIG. 4D shows an example of a confirmation prompt 440 that can be displayed in response to user selection of option 432 from menu 430 of FIG. 4C according to an embodiment of the present invention. Confirmation prompt 440 can be similar to confirmation prompt 350 of FIG. 3B, and a proposed expiration date can be extracted from the message in the manner described above. Month box 442, date box 444, and year box 446 can be pre-populated with expiration date information extracted from the message (e.g., as described above), and boxes 442, 444, 446 can also provide user-operable input controls to allow the user to modify the information. Cancel button 448 can be selected to cancel the operation and return to screen 400 as shown in FIG. 4A. OK button 450 can be selected to complete the operation, resulting in message 410 being moved to an auto-remind message collection until the expiration date becomes imminent, as described below. In some embodiments, confirmation prompt 440 can be omitted entirely, or confirmation prompt 440 can be presented only in instances where an expiration date was not extracted by the system (e.g., where the expiration date is rendered in a graphical object or otherwise was not detected by the pattern-matching algorithm).

Figure 4E:
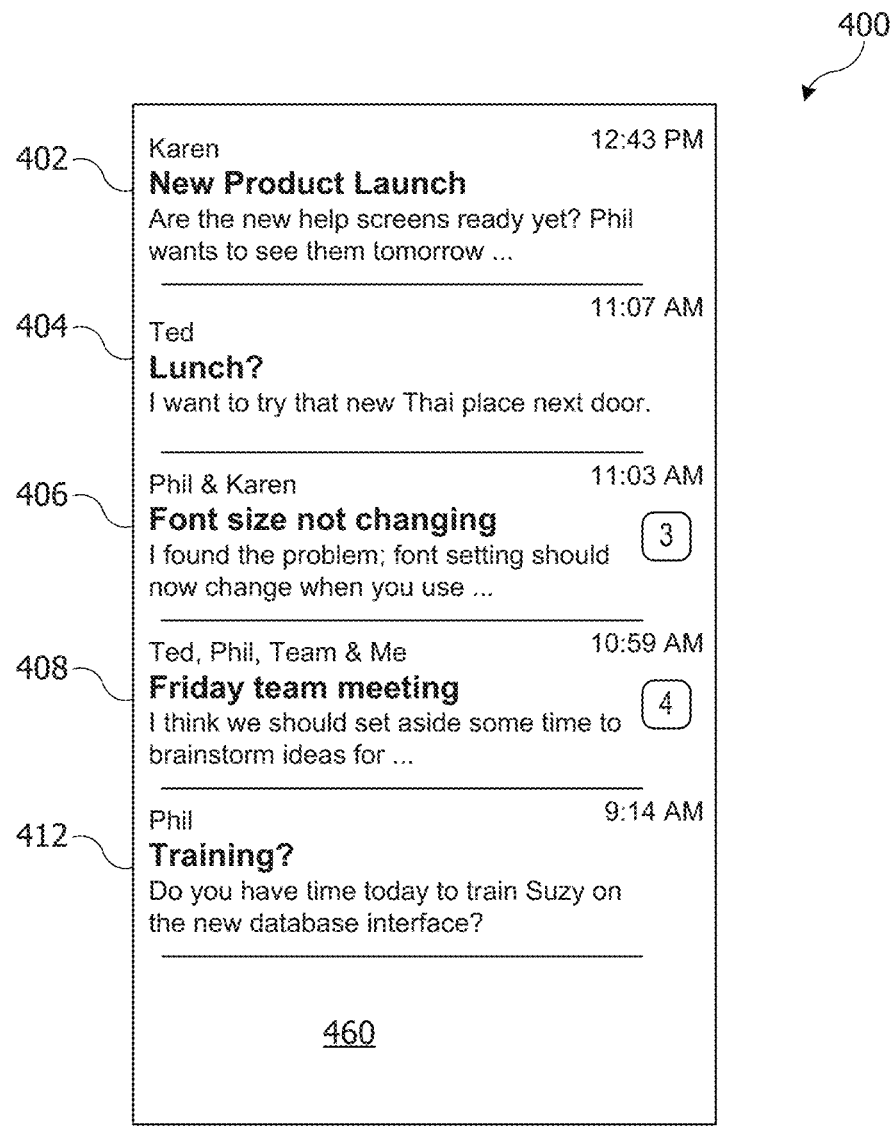

After the user confirms, the user interface can present message list screen 400 in a modified state as shown in FIG. 4E. As shown, message 410 has been removed from the list and message 412 has moved into the space formerly occupied by message 410. In this example, message 412 happens to be the last message in the collection being viewed, and white space 460 is visible below message 412. If the collection includes additional messages, space 460 can be used to present another message that was not previously visible in screen 400.

Figure 4F:
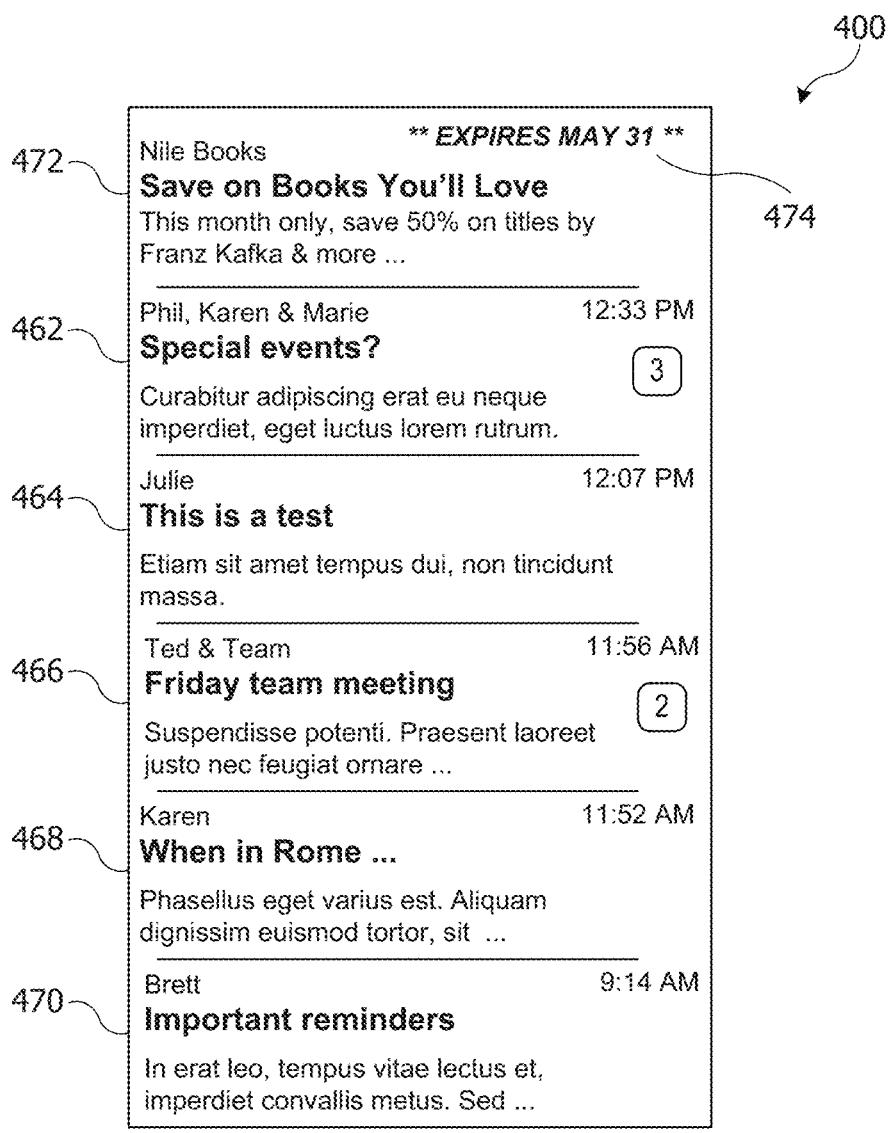

The operations of FIGS. 4A-4E can result in message 410 being removed from the user's inbox until its expiration date becomes imminent. When the expiration date becomes imminent, message 410 can be automatically restored to the user's inbox. FIG. 4F shows a message list screen 460 that can correspond to the user's inbox at a later time, close to the expiration date of message 410. In this example, screen 460 displays recently received messages 462, 464, 466, 468, 470, which can be presented in an order based on order of receipt, e.g., with the most recently received message at the top. At the top of the list is restored message 472, which corresponds to message 410 of FIG. 4A. In this example, restored message 472 is placed at the top of the message list (out of order of date received), which can make it more likely that the user will see restored message 472. In addition or instead, restored message 472 can be marked with a visual indicator to alert the user to its expiration date. For example, rather than presenting a time stamp corresponding to when the message was received (as is the case for recent messages 462, 464, 466, 468, 470), screen 460 can present message 472 with an expiration alert 474 indicating the expiration date. Other visual indicators can also be used in addition to or instead of expiration alert 474, including indicators based on font color and/or size, background color, badges, or the like. In some embodiments, a pop-up alert message, alert sound, or the like can be generated when a message is restored to the inbox based on an imminent expiration date. Use of visual indicators and alerts can reduce the likelihood of the expiration date passing before the user realizes that expiration is imminent.

It will be appreciated that the user interfaces described herein are illustrative and that variations and modifications are possible. Size, position, and arrangement of elements can be varied. For instance, in some embodiments, a message list (e.g., as shown in FIG. 4A) and a complete message (e.g., as shown in FIG. 3A) can be presented on a single screen (e.g., in separate panes). Glyphs, expiration alerts, and other graphical elements can be modified as desired. User interface elements and input gestures can also be modified. For example, a user input gesture distinct from a deferral gesture can be defined for identifying expirable messages.

Examples of processes that can be implemented to support management of expirable messages will now be described. In some embodiments, these processes, or portions thereof, can be implemented in any of client 108 (or client 110), message management service 104, or messaging service 102 of FIG. 1.

Figure 5:
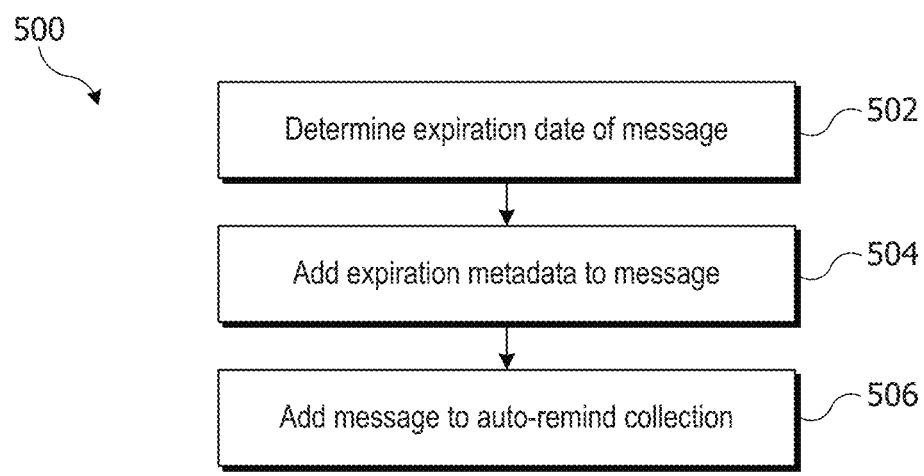
FIG. 5 is a flow diagram of a process for identifying an expirable message according to an embodiment of the present invention.

FIG. 5 is a flow diagram of a process 500 for identifying an expirable message according to an embodiment of the present invention. At block 502, process 500 can determine the expiration date of a message. For instance, an expiration date can be automatically extracted from a message or provided by a user (e.g., via the user interfaces of FIG. 3B or FIG. 4D). At block 504, process 500 can add expiration metadata to the message. The expiration metadata can include, e.g., the expiration date determined at block 502. In some embodiments, the expiration metadata can also include a flag indicating whether the message has an expiration date and/or information indicating how the expiration date was determined (e.g., automatically or from user input). At block 506, an expirable message can be added to an auto-remind collection. In some embodiments, this can include removing the message from the user's inbox.

Figure 6:
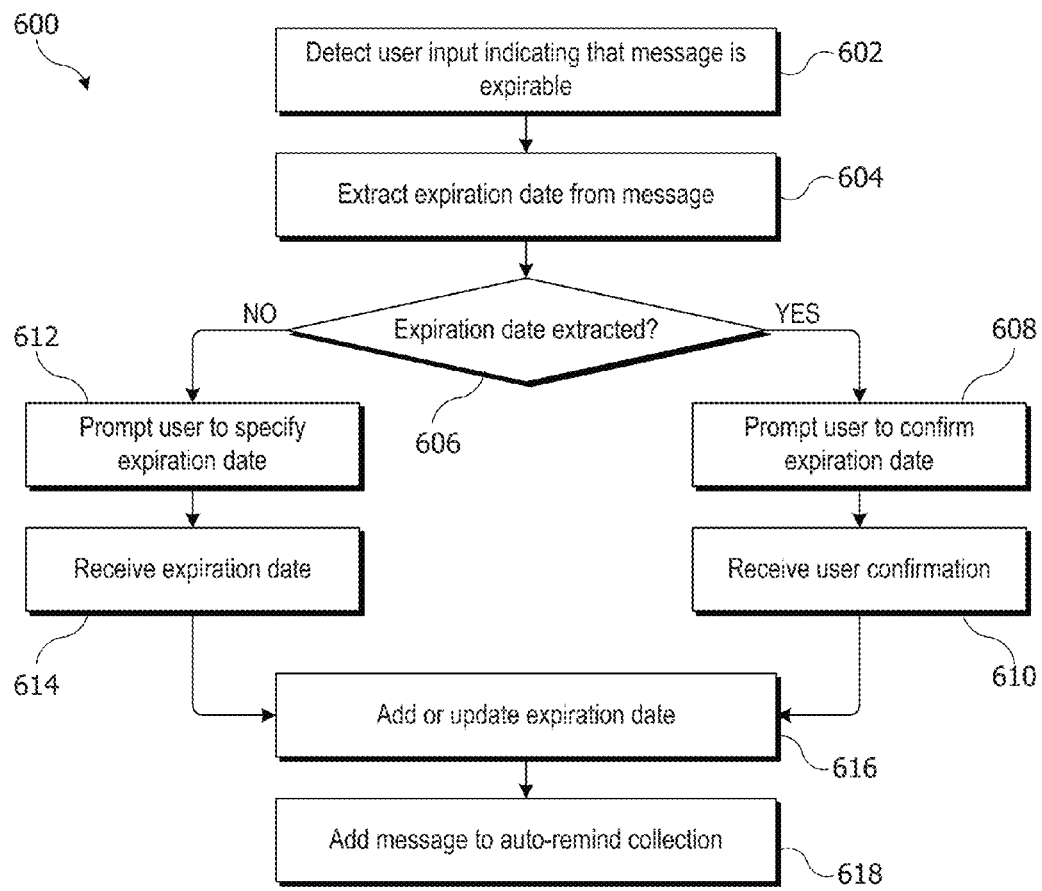
FIG. 6 is a flow diagram of another process for identifying an expirable message based on user input according to an embodiment of the present invention.

Process 500 (or portions thereof) can be performed automatically or in response to user input. For instance, in some embodiments, whether to treat a message as expirable can be based on user input. FIG. 6 is a flow diagram of a process 600 for identifying an expirable message based on user input according to an embodiment of the present invention. At block 602, process 600 can detect user input indicating that a message is expirable. For example, process 600 can detect user operation of control button 306 of FIG. 3A or a gesture-based selection as shown in FIGS. 4B and 4C. At block 604, process 600 can extract an expiration date from the message. For example, block 604 can include searching the message body for phrases associated with expiration (e.g., as described above) and/or searching message headers for headers indicative of an expiration date (e.g., an "X-Expires" header as used by some email services). In some embodiments, parsing of a message to extract an expiration date can be performed by message parser 222 of FIG. 2 prior to sending the message to the client, and message parser 222 can add expiration metadata (including the extracted expiration date) to the version of the message that is sent to the client. Where this is the case, the client can read the extracted expiration date (if there is one) from the expiration metadata rather than parsing the message.

At block 606, process 600 can determine whether an expiration date was extracted. If so, at block 608, process 600 can prompt the user to confirm the expiration date (e.g., using confirmation prompt 350 of FIG. 3B or confirmation prompt 440 of FIG. 4D). At block 610, process 600 can receive the user confirmation; in some embodiments, this can include receiving a modified expiration date as described above. In some embodiments, user confirmation of an extracted expiration date can be skipped. If, at block 606, no expiration date was extracted, then at block 612, process 600 can prompt the user to specify the expiration date. In some embodiments, where no expiration date was extracted, a prompt similar to confirmation prompt 350 of FIG. 3B or confirmation prompt 440 of FIG. 4D can be used, and the date boxes can be prepopulated with a default date (e.g., based on the current date or some other date). The user can interact with the prompt to specify the expiration date. At block 614, process 600 can receive the expiration date. In some embodiments, the user can have the option to cancel at block 608 or block 612, and if the user exercises this option, process 600 can end.

Assuming the user does not cancel, at block 616, process 600 can add (or update) expiration metadata for the message to include the expiration date. At block 618, process 600 can add the message to an auto-remind message collection. For example, where process 600 executes on a client device (e.g., client device 108 or 110 of FIG. 1), the client device can send an update instruction to message management service 104 or messaging service 102; the instruction can include the added or updated expiration metadata and an indicator that the user has identified the message as expirable.

Figure 7:
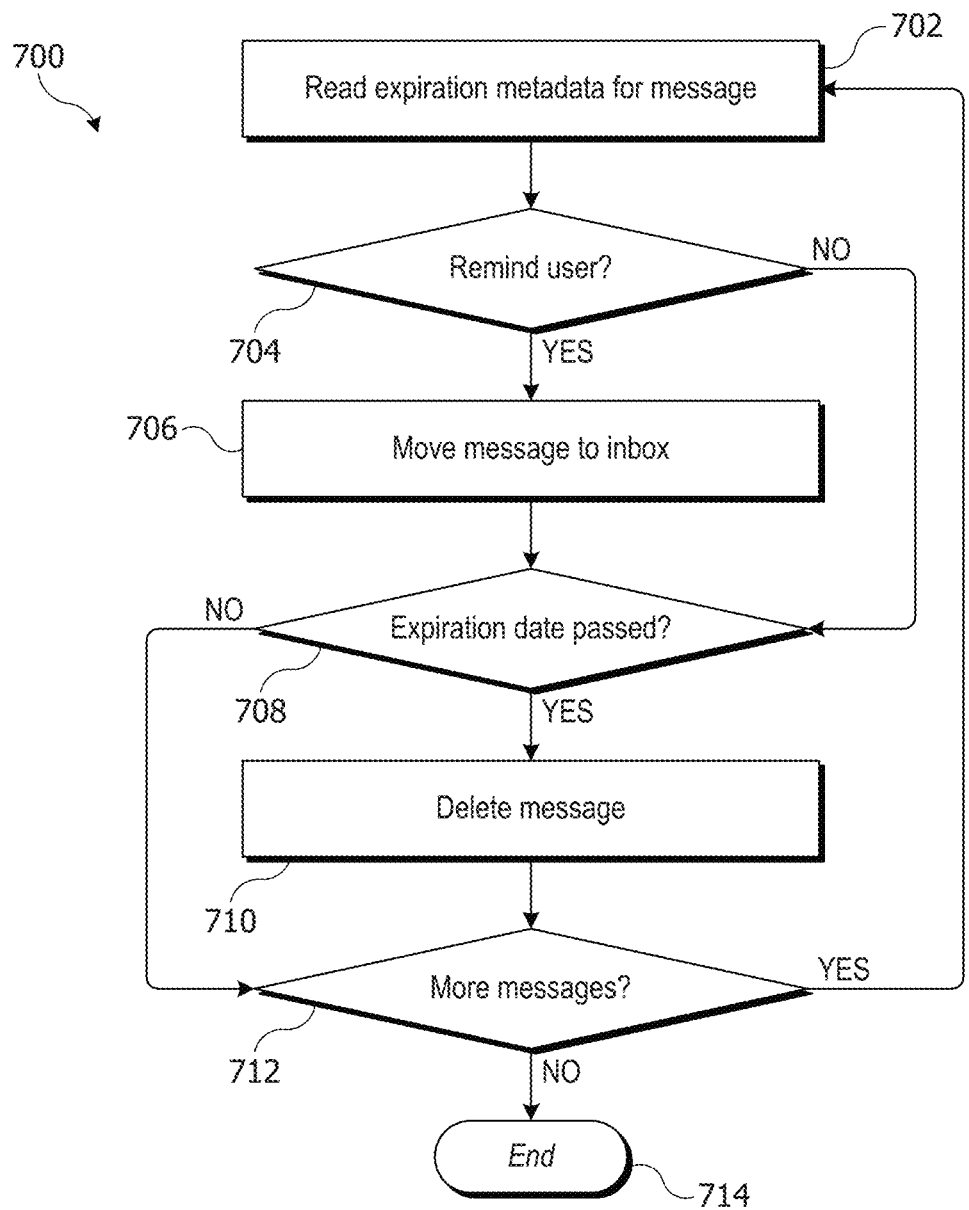
FIG. 7 is a flow diagram of a process for managing an auto-remind message collection according to an embodiment of the present invention.

Execution of process 500 or process 600 can result in messages being added to an auto-remind collection, from which messages can be automatically restored to the user's inbox as their expiration dates become imminent. FIG. 7 is a flow diagram of a process 700 for managing an auto-remind collection according to an embodiment of the present invention. Process 700 can be implemented, e.g., in message expiration engine 224 of message management service 200 of FIG. 2. Process 700 can be run periodically (e.g., once every 24 hours, once every 12 hours, etc.) to process all messages currently in the auto-remind collection.

At block 702, process 700 can read expiration metadata for a message in the auto-remind collection. At block 704, process 700 can determine whether the user should be reminded of the message. For example, one or more criteria can be defined for determining whether the expiration date of the message is "imminent." A fixed criterion can be used to define imminence. For example, an expiration date can become imminent on the expiration date, on the day before the expiration date, two days before, or the like. In some embodiments, the user can specify the imminence criterion to be used for, either globally or per-message. A global criterion can be specified, e.g., using a settings menu provided via a client application program. A per-message criterion can be specified, e.g., by including an option to specify the reminder criterion in confirmation prompt 350 or confirmation prompt 440 described above. In some embodiments, a default criterion can be defined and used to pre-populate the confirmation prompt, allowing the user the option to override the default on a per-message basis. Where a criterion for determining when the expiration date is imminent is specified on a per-message basis, the expiration metadata for each expirable message can include a reminder date or other indicator of the appropriate criterion to use. At block 704, process 700 can apply the defined criterion, with the result that if the expiration date satisfies the criterion, a decision to remind the user is taken.

If the user should be reminded of the message (e.g., if expiration is imminent), then at block 706, process 700 can move the message to the user's inbox. For example, where process 700 is implemented in message management service 200 of FIG. 2, message expiration engine 224 can instruct other message management modules 212 to restore the message to the inbox. In this context, restoring the message to the inbox can include sending an update instruction to the messaging service, retrieving the message from the messaging service or message cache 216, and/or sending the message to client 202 as a message to be added to the inbox. In some embodiments, the message sent to client 202 can include metadata indicating that it is an expirable message with an imminent expiration date; this can be the same expiration metadata that was previously added to the message (which can include the expiration date). Client 202 can read the expiration metadata and detect the imminent expiration, e.g., via an explicit imminence flag or by comparing the expiration date to the current date. Accordingly, client 202 can display the message with an indicator that its expiration is imminent, e.g., as described above with reference to FIG. 4F.

In some embodiments, process 700 can also include a clean-up operation to detect any messages that may have expired while still in the auto-remind collection. At block 708, process 700 can determine whether the message's expiration date has passed; if so, the message can be deleted (or moved to an archive collection or the like) at block 710. The user need not be alerted that an expired message is being deleted, and user confirmation of message deletion at block 710 is not required.

At block 712, if there are other messages in the auto-remind collection, process 700 can return to block 702 to process the next message. If not, process 700 can end at block 714.

Figure 8:
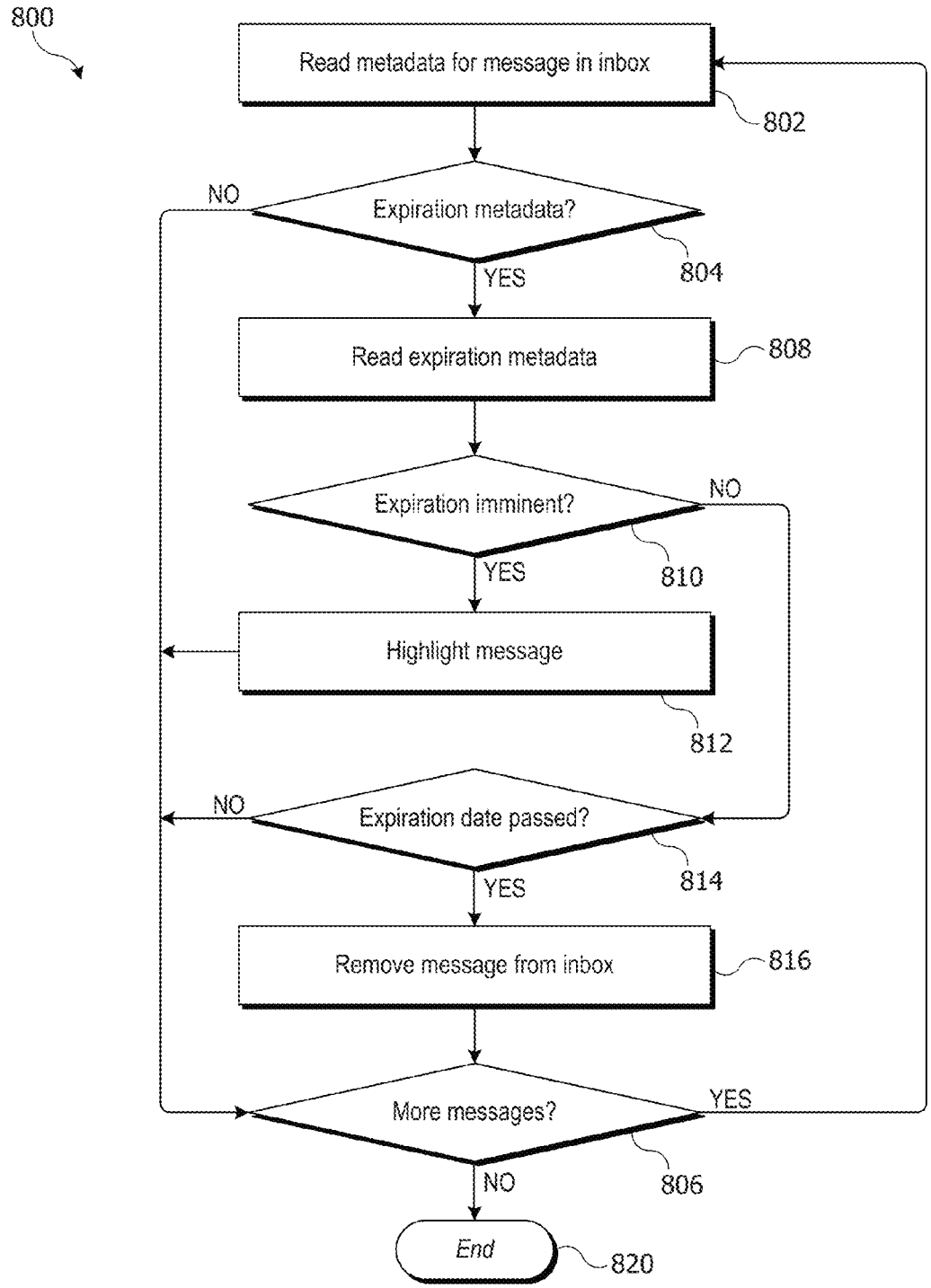
FIG. 8 is a flow diagram of a process for managing expirable messages in a user's inbox according to an embodiment of the present invention.

Process 700 can restore soon-to-expire messages to the user's inbox, allowing the user an opportunity to act on the messages before they expire. In some cases, the user may review the message, act on it, and manually delete it. However, it is possible for the expiration date to pass before the user takes action, or the user may take action but forget to delete the message. Accordingly, it may be desirable to automatically remove expired messages from the inbox. FIG. 8 is a flow diagram of a process 800 for managing expirable messages in a user's inbox according to an embodiment of the present invention. Process 800 can be implemented, e.g., in message expiration engine 224 of message management service 200 of FIG. 2. Process 800 can be run periodically (e.g., once every 24 hours, once every 12 hours, etc.) to process all messages currently in the user's inbox.

At block 802, process 800 can read metadata for a message in the inbox. Depending on whether the message was identified as expirable, the metadata might or might not include expiration metadata. If, at block 804, expiration metadata is not present, process 800 can skip the message and proceed to block 806 to process another message. If, at block 804, expiration metadata is present, then at block 808, process 800 can read the expiration metadata.

At block 810, if the expiration metadata indicates that expiration is imminent, process 800 can highlight the message in the user's inbox at block 812. Highlighting can include presenting visual indicators as described above with reference to FIG. 4F. Other actions can also be taken to attract the user's attention to the soon-to-expire message, such as generating a pop-up alert message, playing a sound, or the like. In some embodiments, blocks 810 and 812 can be performed by a client device (e.g., client 108 or 110 of FIG. 1) while the rest of process 800 is performed by a message management service (e.g., message management service 104) or messaging service (e.g., messaging service 102). In other embodiments message management service 104 or messaging service 102 can determine whether a message should be highlighted and send appropriate instructions to a client device.

If the expiration date is not imminent, process 800 can proceed to block 814 to determine whether the expiration date has passed. If so, at block 816, process 800 can permanently remove the message from the user's inbox. For example, process 800 can delete the message. Alternatively, process 800 can move the message to an archive collection (where it might be subject to automatic deletion after some additional period of time). In some embodiments, prior to execution of process 800, the user can have the option to specify a preferred action to be taken on expired messages, either globally or on a per-message basis. A global preference can be specified, e.g., using a settings menu of a client application. A per-message preference can be specified when the message is marked as expirable (e.g., by offering options via confirmation prompt 350 of FIG. 3B or confirmation prompt 440 of FIG. 4D). In the case of a per-message preference, the user's preference can be recorded in the message's expiration metadata, and block 816 can include reading and carrying out the per-message preference without further user input (e.g., the user need not be alerted that the preferred action is being carried out or prompted to confirm). In some embodiments, removing the message from the inbox can include sending an update instruction to the messaging service, removing the message from message cache 216, and/or sending an instruction to client 202 to remove the message from its local copy of the inbox.

At block 806, if there are more messages in the inbox, process 800 can return to block 802 to process the next message. If not, process 800 can end at block 820.

It will be appreciated that process 500, 600, 700, and 800 are illustrative and that variations and modifications are possible. Steps described as sequential may be executed in parallel, order of steps may be varied, and steps may be modified, combined, added or omitted. The processes can be performed by various computer systems, including a client computer system, a server computer system of a message management service and/or a server computer system of a messaging service. In some embodiments, different portions of the processes can be performed by different computer systems. For example, a standalone client implementation is possible where the client manages a store of messages and performs the operations described herein; such a client may communicate with a messaging service to obtain new messages and/or to forward user instructions regarding the disposition of messages. Alternatively, a message management service (or a messaging service) can implement processing operations such as extracting expiration dates, determining when to restore expirable messages to the inbox, and/or determining when to permanently remove expired messages from the inbox. The client can present messages to the user based on instructions from the message management service and provide instructions based on user input to the message management service. Other combinations and distributions of processing operations between different computer systems are also possible.

While the invention has been described with respect to specific embodiments, one skilled in the art will recognize that numerous modifications are possible. For example, while the description above may make reference to email, the invention can be applied to any type of electronic message that can be stored and managed.

The granularity with which expiration dates are defined can vary. In examples above, an offer that expires at the end of a specified day is contemplated, and a granularity of one day (24 hours) may be sufficient. However, those skilled in the art with access to the present disclosure will appreciate that a finer granularity (e.g., hourly) or coarser granularity (e.g., weekly or monthly) can be applied where appropriate, e.g., to further facilitate managing event-related messages where the event may take place at a particular time on a particular date (e.g., on May 31, 2014, from 6:00 pm to 9:00 pm). Accordingly, in some embodiments, expiration dates may include a more specific time indicator than a 24-hour day.

In some embodiments, techniques similar to those described above can be used to identify and flag "short-fuse" messages that the user may receive. For example, message parser 222 of FIG. 2 can read each newly received message and detect an expiration date. If the expiration date is already imminent (e.g., according to a specific criterion such as within two days), message parser 222 can add expiration metadata so indicating, and the client can display the message with a visual indicator alerting the user of the imminent expiration (e.g., similar to indicia shown in FIG. 4F), without the user first having to identify the message as expirable. In some embodiments, the visual indicator can be selected to distinguish short-fuse messages from restored messages that the user previously identified as expirable as well as from non-expiring messages.

Further, messages that have been moved to an auto-remind collection can be accessible to the user. In some embodiments, the user can browse or search the auto-remind collection in a manner similar to any other message collection (e.g., email folder). Thus, the user can but need not wait for an expirable message to reappear in the inbox before retrieving and acting on it. For instance, if the user is contemplating a purchase and happens to remember receiving a relevant offer (or thinks she might have received a relevant offer), the user can browse or search the auto-remind collection and access the message that contains the offer.

In still other embodiments, messages identified as expirable need not be moved from the inbox to an auto-remind collection. For example, process 600 (FIG. 6) can be modified such that after an expiration date is added to the message, the message remains in the inbox (unless the user takes some other action to remove it). When the expiration date becomes imminent, the displayed message, which may have never left the inbox, can be promoted within the inbox to attract the user's attention. For example, as shown in FIG. 4F, the message can be moved to the top of the message list and/or marked with an expiration alert or other visual indicator. Pop-up alerts, sounds, and the like (e.g., as described above) can also be used regardless of whether the message is being restored to the inbox or was there all along.

In some embodiments, a computer system such as message management service 104 of FIG. 1 can automate identification of messages as expirable. For example, message management service 104 can detect patterns in message content that are suggestive of an expirable message, such as language related to sales, discounts, coupons, or the like. As another example, message management service 104 may recognize certain senders as sources of offers. As still another example, message management service 104 can detect a pattern in the user's behavior where the user consistently designates messages having certain properties (e.g., specific content or specific sender) as expirable. Where such patterns are detected, the system can suggest to the user to move the message to an auto-remind collection (e.g., by instructing a client device to present this option together with the message) or to establish an automatic rule to process messages satisfying the pattern.

Some of the examples described above may assume that a message management service manages the automatic reminder and expiration functionality. However, similar functionality can be implemented by a messaging service and/or a client device or client application program, and use of a message management service is not required.

Figure 9:
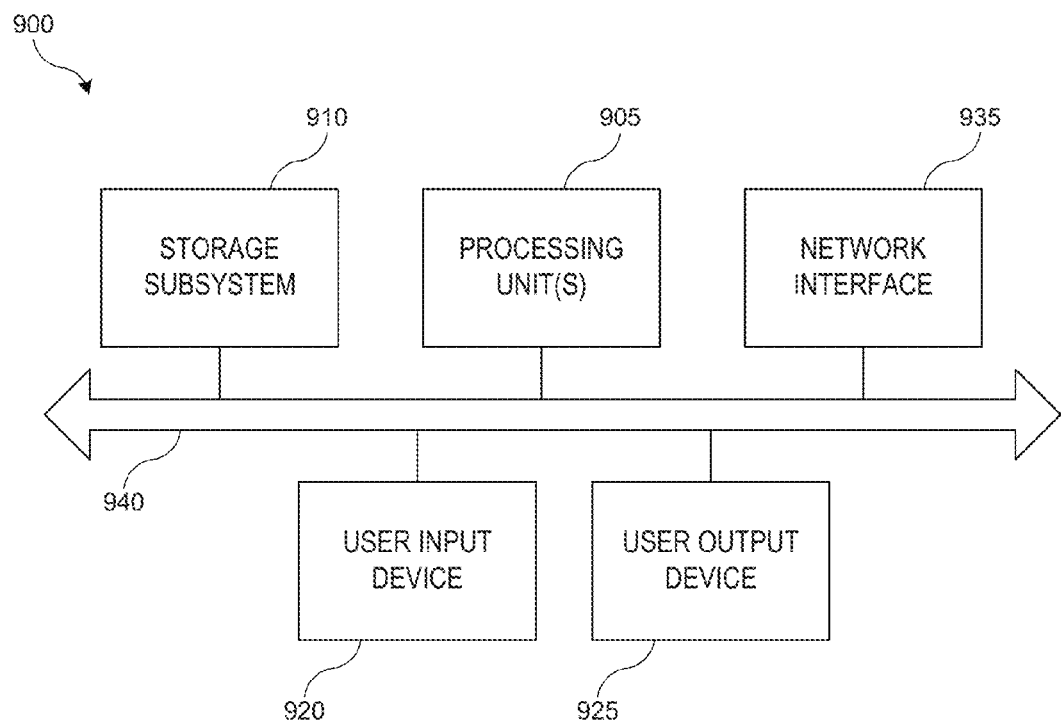
FIG. 9 shows a simplified block diagram of a representative computer system that can be used in an embodiment of the present invention.

Various operations described herein can be implemented on computer systems, which can include systems of generally conventional design. FIG. 9 shows a simplified block diagram of a representative computer system 900. In various embodiments, computer system 900 or similar systems can implement a user device (e.g., any of clients 108, 110 of FIG. 1) and/or a server system (e.g., servers implementing all or part of messaging service 102 and/or message management service 104 of FIG. 1). Computer system 900 can include processing unit(s) 905, storage subsystem 910, input devices 920, output devices 925, network interface 935, and bus 940.

Processing unit(s) 905 can include a single processor, which can have one or more cores, or multiple processors. In some embodiments, processing unit(s) 905 can include a general-purpose primary processor as well as one or more special-purpose co-processors such as graphics processors, digital signal processors, or the like. In some embodiments, some or all processing units 905 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 905 can execute instructions stored in storage subsystem 910.

Storage subsystem 910 can include various memory units such as a system memory, a read-only memory (ROM), and a permanent storage device. The ROM can store static data and instructions that are needed by processing unit(s) 905 and other modules of computer system 900. The permanent storage device can be a read-and-write memory device. This permanent storage device can be a non-volatile memory unit that stores instructions and data even when computer system 900 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 905 need at runtime.

Storage subsystem 910 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 910 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 910 can store one or more software programs to be executed by processing unit(s) 905, such as an operating system, a messaging client application, and so on. "Software" refers generally to sequences of instructions that, when executed by processing unit(s) 905, cause computer system 900 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 905. Software can be implemented as a single program or a collection of separate programs or program modules that interact as desired. From storage subsystem 910, processing unit(s) 905 can retrieve program instructions to execute and data to process in order to execute various operations described herein.

A user interface can be provided by one or more user input devices 920 and one or more user output devices 925. Input devices 920 can include any device via which a user can provide signals to computer system 900; computer system 900 can interpret the signals as indicative of particular user requests or information. In various embodiments, input devices 920 can include any or all of a keyboard, track pad, touch screen, mouse or other pointing device, scroll wheel, click wheel, dial, button, switch, keypad, microphone, and so on.

User output devices 925 can include any device via which computer system 900 can provide information to a user. For example, user output devices 925 can include a display to display images generated by computer system 900. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 925 can be provided in addition to or instead of a display. Examples include indicator lights, speakers, tactile "display" devices, printers, and so on.

In some embodiments, input device 920 and output devices 925 can interoperate to provide a graphical user interface ("GUI") that allows a user to interact with computer system 900 by using an input device to select a control element displayed on the screen (e.g., by operating a pointing device such as a mouse or touching the location where a control element is displayed on a touch screen).

Network interface 935 can provide voice and/or data communication capability for computer system 900, including the ability to communicate with various messaging services and/or message management services to access and act upon messages. In some embodiments, network interface 935 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 935 can provide wired network connectivity (e.g., Ethernet) in addition to or instead of a wireless interface. Network interface 935 can be implemented using a combination of hardware (e.g., antennas, modulators/demodulators, encoders/decoders, and other analog and/or digital signal processing circuits) and software components.

Bus 940 can include various system, peripheral, and chipset buses that communicatively connect the numerous components of computer system 900. For example, bus 940 can communicatively couple processing unit(s) 905 with storage subsystem 910. Bus 940 can also connect to input devices 920 and output devices 925. Bus 940 can also couple computing system 900 to a network through network interface 935. In this manner, computer system 900 can be a part of a network of multiple computer systems (e.g., a local area network (LAN), a wide area network (WAN), an intranet, or a network of networks, such as the Internet. In some embodiments, bus 940 and network interface 935 can operate to connect any number of computers together to provide large-scale computing capacity (e.g., server farms) that can communicate with clients through a WAN interface (which can be part of network interface 935).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 905 can provide various functionality for computer system 900. For example, where computer system 900 implements a client device, processing unit(s) 905 can execute a messaging client app that provides an interface operable by the user to interact with messages, including, e.g., any or all of the interface screens described above. Where computer system 900 implements a server (e.g., part or all of message management service 104 or messaging service 102 of FIG. 1), processing unit(s) 905 can execute server applications that receive and respond to client requests and perform other operations described herein as being performable by a server or service.

It will be appreciated that computer system 900 is illustrative and that variations and modifications are possible. Computer system 900 can have other capabilities not specifically described here (e.g., mobile phone, global positioning system (GPS), power management, one or more cameras, various connection ports for connecting external devices or accessories, etc.). Further, while computer system 900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   determining, by a receiving computer system, an expiration date for a message from an inbox of a recipient;
   automatically moving the message from the inbox of the recipient user to an auto-remind message collection;
   automatically restoring the message to the inbox at a time when the expiration date is imminent; and
   automatically deleting the message from the inbox when the expiration date has passed.

2. The method of claim 1 further comprising:
   adding expiration metadata to the message, the expiration metadata including the expiration date.

3. The method of claim 1 wherein determining the expiration date includes:
   parsing a message body to detect a phrase indicative of expiration; and
   extracting the expiration date from the detected phrase.

4. The method of claim 1 wherein moving the message from the inbox to the auto-remind message collection is performed in response to a user input.

5. The method of claim 1 wherein adding the expiration metadata to the message and moving the message from the inbox to the auto-remind message collection are performed in response to a user input.

6. The method of claim 1 wherein expiring the message from the inbox includes deleting the message.

7. A computer-implemented method comprising:
   receiving, a receiving computer system, user input originating from a recipient of a message, the user input indicating that the message is expirable;
   automatically determining an expiration date for the message;
   assigning, at a time before the expiration date is imminent, the message to an auto-remind message collection such that the message ceases to be presented in an inbox of the recipient;
   restoring the message to the inbox of the recipient at the time when the expiration date is imminent;
   automatically promoting, at a time when the expiration date is imminent, a displayed version of the message in an inbox of the recipient; and
   automatically deleting the message from the inbox of the recipient when the expiration date has passed.

8. The method of claim 7 wherein promoting the displayed version of the message includes one or both of:
   moving the message to a top position of a list of messages in the inbox of the recipient; or
   marking the message with a visual indicator that the expiration date is imminent.

9. The method of claim 7 wherein the message is received from a message management service and wherein determining the expiration date includes reading expiration metadata added to the message by the message management service, the expiration metadata including a proposed expiration date.

10. The method of claim 9 wherein determining the expiration date further includes prompting the user to confirm the proposed expiration date.

11. The method of claim 9 wherein assigning the message to an auto-remind message collection includes sending a message update instruction to the message management service.

12. The method of claim 7 wherein determining the expiration date includes:
   analyzing a body of the message to detect a text pattern indicative of expiration; and
   extracting a proposed expiration date from the detected text pattern.

13. The method of claim 7 wherein the message is received from a message management service and wherein restoring the message to the inbox includes receiving the message from the message management service a second time, together with expiration metadata indicating that the expiration date is imminent.

14. A computer system comprising:
   a memory; and
   a processor coupled to the memory and configured to:
   determine an expiration date for a message an inbox of a recipient user;
   automatically modify expiration metadata to the message, the expiration metadata including the expiration date;
   automatically move the message from the inbox of the recipient user to an auto-remind collection at a time before the expiration date is imminent;
   automatically restore the message to the inbox at a time when the expiration date is imminent; and
   automatically permanently remove the message from the inbox when the expiration date has passed.

15. The computer system of claim 14 further comprising:
   a user interface coupled to the processor,
   wherein the processor is further configured such that determining the expiration date includes receiving user input via the user interface.

16. The computer system of claim 14 wherein the processor is further configured such that determining the expiration date includes extracting the expiration date from the received message.

17. The computer system of claim 14 further comprising:
   a client interface coupled to the processor and configured to communicate with a client device; and
   a messaging service interface coupled to the processor and configured to communicate with a messaging service,
   wherein the processor is further configured to receive the message via the messaging service interface and to send the message and the expiration metadata to the client device via the client interface.

18. The computer system of claim 17 wherein the processor is further configured to
   send the message to the client device via the client interface after adding the expiration metadata; and
   move the received message from the inbox to the auto-remind collection in response to an instruction received from the client device via the client interface.

19. The computer system of claim 18 wherein the processor is further configured such that restoring the message to the inbox includes re-sending the message to the client device via the client interface.

* * * * *